Oct. 27, 1964     P. T. DURST ETAL     3,154,051
CALIBRATION ADJUSTMENT FOR CONTROL DEVICE SETTING DIALS
Filed Nov. 27, 1963

INVENTORS
Paul T. Durst
Richard E. Juhrman
By Andrew    Atty.

United States Patent Office 3,154,051
Patented Oct. 27, 1964

3,154,051
CALIBRATION ADJUSTMENT FOR CONTROL
DEVICE SETTING DIALS
Paul T. Durst, Brookfield, and Richard E. Fuhrman, Oak Park, Ill., assignors to General Electric Company, a corporation of New York
Filed Nov. 27, 1963, Ser. No. 326,567
4 Claims. (Cl. 116—124)

This invention relates to condition-responsive devices such as thermostats for the control of temperatures in cooking ovens and the like, and in particular relates to means for adjusting the setting dial to conform to the actual performance of the control device.

This invention constitutes an improvement over the invention in Fuhrman and Huddleston U.S. Patent 3,109,-412 granted November 5, 1963, for "Calibration Adjustment for Dials and the Like" and assigned to our present assignee. For adjusting a thermostat dial relative to the setting shaft of the thermostat, structure disclosed in said patent requires a plurality of parts, including in addition to the knob and the dial, a calibration device, fastening means such as a nut or equivalent press-on device for securing the calibration device on the shaft or hub of the knob, and a friction device for frictionally securing the knob and dial assembly on the thermostat shaft. The patent mechanism provides means whereby the calibration mechanic can adjust the dial while it is in operating position relative to the knob but requires that the assembly then be removed from the thermostat shaft in order for the several elements to be made secure.

Our present invention comprises a calibration device in which a single element constitutes the adjustment indicator, the dial securement means, and shaft retention means, and provides for the adjustment of a thermostat dial relative to the thermostat shaft without the necessity of removing the dial from the shaft, either before, during, or after the adjustment.

It is therefore an object of our invention to provide a thermostat dial adjustment device which is low in manufacturing cost, and permits the making of final adjustments of the dial without requiring removal of the knob and dial assembly from the thermostat shaft.

Other features and advantages of our invention will best be understood from the following detailed description of a presently preferred embodiment read in connection with the accompanying drawings in which.

Figure 1:
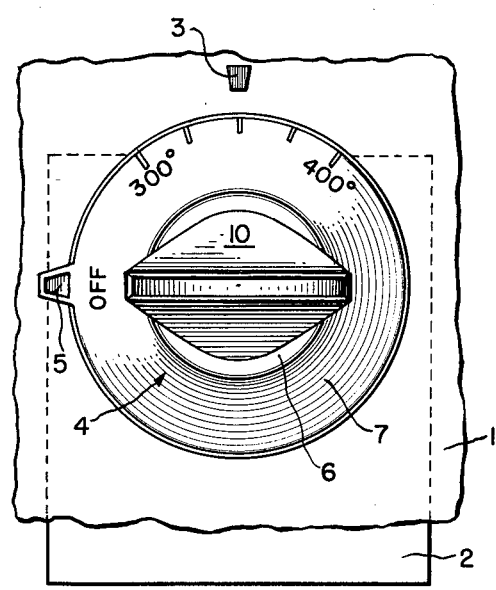
FIG. 1 is a fragmentary front elevation of a control device embodying the present invention, showing said device mounted on a control panel.

In FIG. 1 there is fragmentarily shown a portion of a fixed structure on which is mounted a control device embodying the present invention. For example, the structure may be the control panel 1 of an electric or gas cooking range; the control device 2 may be a thermostat to control the temperature of the range oven (not shown). The panel 1 has any suitable index 3 for registration with indicia on the thermostat dial 4, said indicia being representative of desired control temperatures. The index 3 will register with the dial pointer 5 when the control device is in its non-controlling or "off" condition.

It sometimes happens in the mass production of thermostats and like control devices that the control dial is not precisely oriented, and therefore when the user rotates the dial so that, for example, the 350° F. marking thereon registers with the fixed index, the thermostat may have operated before the attainment of this registration, or may not operate until a few rotational degrees of the dial following said index registration. Of course, this would be disconcerting to the user of the cooking range if, for example, she is attempting to follow a recipe calling for a 350° F. oven temperature. The present invention provides a simple and inexpensive dial and knob assembly whereby a service mechanic may readily make a necessary dial adjustment on a range installed in a domestic kitchen, or the factory calibration mechanic may readily make an adjustment as part of the manufacturing and testing procedure for the thermostats.

Figure 2:
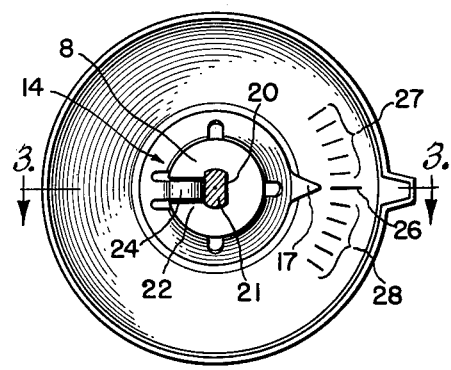
FIG. 2 is a bottom plan view of the control device dial, nob, and calibration clip, the shaft of the control device shown in section.
Figure 4:
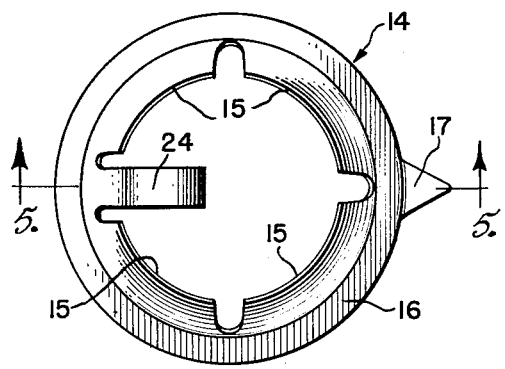
FIG. 4 is a plan view of the calibration clip of FIG. 2 on an enlarged scale.
Figure 3:
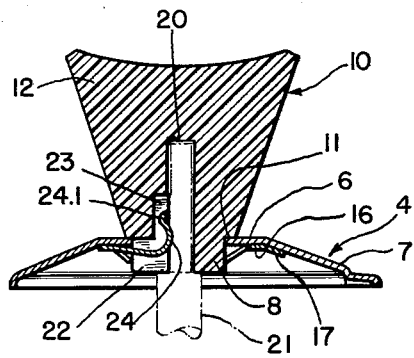
FIG. 3 is a sectional elevation taken on lines 3—3 of FIG. 2.
Figure 5:
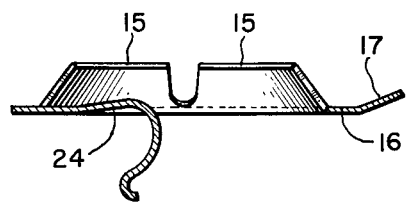
FIG. 5 is a sectional elevation taken on lines 5—5 of FIG. 4.

Looking now at FIG. 3, it is seen that the dial 4 is frusto-conical, having a center platform 6, and the sloping side portion 7 on which the temperature markings are inscribed. Said dial surface bearing these markings will hereinafter be referred to as the obverse face of the dial. The central aperture of the dial snugly accommodates the passage of the substantially cylindrical hub 8 of the knob 10. A shoulder 11 delineating between the hub 8 and the finger-grip portion 12 of the knob is frictionally engaged by the platform 6 of the dial upon the placement of the calibration clip 14. This clip secures said dial in relatively tight frictional engagement with the shoulder 11, while at the same time permitting manual rotation of the dial relative to the knob. In a preferred form, the calibration clip 14, FIG. 4, is an annulus of spring metal such as spring steel. The annular opening is defined by four arcuate segments 15, said segments inclining with respect to a peripheral base 16. As shown in FIG. 3, the base is adapted to register with the portion 6 of the reverse face of the dial. The clip 14 has a pointer 17 inclined to match the slope of the dial portion 7, and thus to accurately register with certain dial calibration marks later described. It will be noted in FIGS. 2 and 3 that the axial bore 20 in the hub of the knob and in the knob portion 12, is non-circular, and that the thermostat shaft 21 is similarly shaped, whereby the knob is non-rotatably held on the shaft. Further, it will be noted that the bore 20 communicates with a slot which has a portion 22 extending radially to the edge of the hub 8, and an axially extending portion 23 which is wholly within the knob portion 12. These slot portions accommodate a friction finger 24 extending inwardly, and then substantially axially, from the portion 16 of the calibration clip 14, FIG. 4. As best shown in FIG. 2, the friction finger 24 is adapted to engage with one of the flat sides of the shaft 21.

After the dial has been assembled into the knob, the calibration clip is forced over the knob hub portion. The annular opening defined by the respective segments 15 is slightly undersize relative to the diameter of the hub, whereby said segments must yield to permit the calibration clip to be passed over the hub. When the clip is in its ultimate home position in which it presses the dial tightly against the shoulder 11, the segments grip the hub so that the clip cannot be withdrawn from the hub. The dial, however, is not precluded from rotation on the hub, although such rotation is purposely made difficult so as to prevent accidental rotation of the dial during the use of the control device.

It has previously been noted that it may be necessary to perform an adjustment of the dial relative to the thermostat shaft. To facilitate such an adjustment the reverse face of the dial is inscribed with a calibration mark 26 which may be termed a "bench mark," for in a thermostat which is exact in its operation, and the dial is positioned so that the calibration clip pointer registers with the mark 26, the temperature indicia on the dial would truly represent the performance of the thermostat as the various temperature indicia are brought into registry with the index mark 3 of the mounting panel 1. In the initial assembly of the thermostat, therefore, the dial is placed on the hub 8, the calibration clip applied thereto as above noted, and the dial is manually rotated relative to the hub so as to bring the pointer 17 of the calibration clip into registry with the marking 26 on the dial. The knob and dial assembly are thereupon placed on the thermostat shaft for a calibration test to determine whether or not it is required to adjust the dial relative to the thermostat shaft.

A conventional manner of calibrating a thermostat is to expose its temperature sensing element (not shown) to a heat source having a known temperature—for example, 350° F.—and to rotate the knob (and thereby the thermostat shaft) until the thermostat mechanism operates. For example, if the thermostat includes electric switch contacts which are to open upon increasing temperature, such switch contacts would, in the test fixture, be included in an energy circuit for an electric light. Since the contacts should be closed at all temperatures below 350° F. the performance of the thermostat can be checked by noting what dial marking registers with the test fixture index when the test fixture light is extinguished. If such operation occurs at the 350° marking on the dial, the thermostat is accurate, and no further adjustment is normally required. On the other hand, if the thermostat operates before or after the registry of the 350° F. dial marking with the fixed index, the dial is rotated on the knob in the necessary direction and extent to effect the proper registry.

This can be done without removing the knob and dial from the shaft. In accomplishing the adjustment with the dial on the shaft, the knob is held in the rotational position it occupied when operation of the thermostat occurred, and the dial rotated as desired. The frictional engagement between the dial, the shoulder 11 on the knob, and the calibration clip 14, permit this rotation.

In addition to the index 26, the reverse face of the dial has two series of markings, respectively 27 and 28, FIG. 2. These markings represent specific temperature increments, and after observing the discrepancy between the dial temperature indicia and the operation of the thermostat at the known calibration temperature, the operator may remove the knob and note the position of the dial relative to the pointer 17 of the calibration clip. Because the shaft 21 is non-circular and fits snugly into the non-circular bore in the knob 10, and because the slotted portions 22 and 23 place the friction finger 24 in undeviating registry with the knob and the shaft, the position of the dial relative to the pointer 17 is an accurate representation of the position of the dial relative to the shaft 21.

For example, if the thermostat operated when the 340° F. mark on the obverse of the dial registered with the test fixture index, the operator would rotate the dial until the 350° F. marking on the obverse dial face registered with the calibration fixture index. Upon removing the knob and dial assembly from the shaft (and on the premise that each of the markings of the respective groups 27 and 28 represented 10° F. increments) it would be observed that the pointer 17 registered with the first marking of the 27 series. The converse procedure would be followed, of course, if the thermostat did not operate until the dial face marking representing 360° F. came into registry with the fixture index.

It is not unusual for a production run of thermostats to show a substantially uniform variation. When the first few calibration checks of a production run indicated that this was the situation, the operator may discontinue individual testing of the remainder of the run, and after adjusting one dial to the proper point without removing the dial from the thermostat shaft, can then remove the dial and observe the relation of the pointer 17 to the several indexing marks on the reverse face of the dial. Thereupon, the necessary number of dials to accommodate the remainder of the production run may be similarly adjusted, the dials mounted on the thermostats, and the thermostats packed for final disposition.

In addition to orienting the calibration clip 14 in proper relation to the shaft 21, the finger 24 yieldably retains the knob and dial assembly on the shaft 21. It will be noted in FIG. 3, in which the shaft 21 is shown in broken line, that a curved portion of the finger 24 projects into the bore 20. The extent of this projection is such that when the shaft is inserted in the bore 20, its first encounter with the finger 24 rotates the finger counterclockwise of FIG. 3 until the tip 24.1 strikes the base of the slot 23. The further passage of the shaft 21 thereupon distorts the finger 24 to such an extent that it tightly engages the shaft 21.

It should be understood that, although the foregoing description has been specifically related to temperature control devices, a similar knob calibration mechanism may be used for pressure control devices, in which event the several dial markings would be in increments of pressure rather than of temperature.

While there has been described what is at present thought to be a preferred embodiment of the invention, it will be understood that various modifications may be made therein, and it is intended to cover in the appended claims all such modifications which fall within the true spirit and scope of the invention.

What is claimed is:

1. In a control device having an adjustment shaft adapted to be rotated from a first position establishing a non-control condition to any of a multiplicity of other positions indicative of various other operational conditions,
   the combination comprising
   a knob having a hub portion extending axially therefrom,
   wall means providing a shoulder at the juncture of said knob and hub portion,
   said hub portion having an axial passage adapted to non-rotatably receive the said control device shaft, said axial passage having at the free end of said hub portion a radially extending slot, communicating therewith,
   a dial rotatably mounted on said hub portion, said dial having on its obverse face a plurality of index markings representative of operational conditions of said control device and on its reverse face an index mark bearing a predetermined relation to a selected one of said obverse face markings,
   and dial securement means for holding said dial frictionally against said shoulder,
   comprising an annulus of springable metal including a plurality of gripping members defining the annular opening and arranged to permit the passage of said hub portion therethrough only in a direction whereby said dial may be frictionally confined against said shoulder,
   a resilient friction member integral with said annulus and extending inwardly and substantially axially thereof to occupy said slot and said passage for establishing a uniform relation of said annulus and said hub portion,
   and an index pointer projecting radially from said annulus in fixed relation to said friction member for registry with the said index mark on the reverse face of said dial.

2. In a control device having an adjustment shaft adapted to be rotated from a first position establishing a non-control condition to any of a multiplicity of other positions identifying various predetermined control conditions,
   the combination comprising a knob having a substantially cylindrical hub portion extending axially therefrom, wall means providing a shoulder at the juncture of said knob and hub portion, said hub portion having an axial passage adapted to non-rotatably receive the said control device shaft, said axial passage having at the free end of said hub portion a radially extending slot, a substantially frusto-conical dial rotatably mounted on said hub portion, said dial having a plurality of markings respectively identifying the non-control condition and the multiplicity of control conditions, and dial securement means for holding said dial frictionally against said shoulder and adapted for frictionally retaining said knob on a control device shaft, comprising an annulus of springable metal including a plurality of gripping members defining the annular opening and arranged to permit the passage of said hub portion therethrough only in a direction whereby said dial may be frictionally confined against said shoulder, and a resilient friction member integral with said annulus and adapted to extend therefrom in an axial direction to yieldably occupy said slot and said axial passage whereby to establish said knob and said annulus in predetermined rotational relationship.

3. In combination, a knob having a hub portion provided with an axial passage adapted to receive a shaft, said hub having a slot extending from the periphery thereof into communication with said passage, a dial rotatably mounted on said hub, shoulder means delineating between said knob and said hub, and means for maintaining said dial on said hub in frictional engagement with said shoulder means while permitting said dial to be manually rotated on said hub, comprising an annulus of springable metal, a resilient finger integral with said annulus and extending angularly therefrom to occupy said slot for a substantial axial extent for securing said annulus against rotation on said hub, the opening of said annulus being defined by a plurality of elements adapted to grip said hub while permitting passage of said annulus over said hub only in a direction in which said annulus can be caused to urge said dial against said shoulder means.

4. In combination, a knob having a hub portion provided with an axial passage adapted to receive a shaft, said hub having a slot extending axially thereof, a dial rotatably mounted on said hub, wall means delineating between said knob and said hub, and means for maintaining said dial on said hub in frictional engagement with said wall means while permitting said dial to be manually rotated on said hub, comprising an annulus of springable metal, a resilient finger integral with said annulus and extending inwardly and upwardly therefrom to occupy said slot for a substantial axial extent for securing said annulus against rotation on said hub, the opening of said annulus being defined by a plurality of elements adapted to grip said hub while permitting passage of said annulus over said hub only in a direction in which said annulus can be caused to urge said dial against said wall means.

References Cited in the file of this patent

UNITED STATES PATENTS

| | | |
|---|---|---|
| 2,179,281 | Coultrip | Nov. 7, 1939 |
| 2,321,158 | Rees | June 8, 1943 |
| 3,007,726 | Parkin | Nov. 7, 1961 |
| 3,032,807 | Lanius | May 8, 1962 |
| 3,102,508 | Smith | Sept. 3, 1963 |
| 3,109,411 | Fuhrman | Nov. 5, 1963 |
| 3,109,412 | Fuhrman et al. | Nov. 5, 1963 |

FOREIGN PATENTS

| | | |
|---|---|---|
| 213,087 | Austria | Jan. 25, 1961 |